United States Patent
York

(10) Patent No.: US 9,919,864 B2
(45) Date of Patent: Mar. 20, 2018

(54) CARTRIDGE AND METHOD FOR THE PREPARATION OF BEVERAGES

(71) Applicant: Koninklijke Douwe Egberts B.V., Ultrecht (NL)

(72) Inventor: Geoffrey York, Pelsall (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 52 days.

(21) Appl. No.: 15/207,382

(22) Filed: Jul. 11, 2016

(65) Prior Publication Data

US 2016/0340109 A1 Nov. 24, 2016

Related U.S. Application Data

(62) Division of application No. 13/699,165, filed as application No. PCT/GB2011/000851 on Jun. 6, 2011, now Pat. No. 9,415,930.

(30) Foreign Application Priority Data

Jun. 11, 2010 (GB) .................................. 1009854.9

(51) Int. Cl.
   *B65D 85/804* (2006.01)
   *A47J 31/00* (2006.01)
   (Continued)

(52) U.S. Cl.
   CPC .......... *B65D 85/8043* (2013.01); *A47J 31/00* (2013.01); *A47J 31/0642* (2013.01); *B65D 25/40* (2013.01); *B65D 85/80* (2013.01)

(58) Field of Classification Search
   CPC .... B65D 85/8043; B65D 85/80; B65D 25/40; A47J 31/00; A47J 31/0642
   See application file for complete search history.

(56) References Cited

U.S. PATENT DOCUMENTS

2,778,739 A 1/1957 Rodth
3,937,134 A 2/1976 Molenar
(Continued)

FOREIGN PATENT DOCUMENTS

AT 11248 U 7/2010
AT 507834 8/2010
(Continued)

OTHER PUBLICATIONS

Combined Search and Examination Report dated Jan. 14, 2015 for Application No. GB1412635.3 (7 pgs.).
(Continued)

*Primary Examiner* — Erik Kashnikow
*Assistant Examiner* — Chaim A Smith
(74) *Attorney, Agent, or Firm* — Fitch, Even, Tabin & Flannery LLP

(57) ABSTRACT

A cartridge contains a beverage ingredient which comprises liquid beverage ingredient and elongate particles of beverage ingredient. The cartridge comprises an inlet (45) for the introduction of an aqueous medium, an outlet (44) for a beverage produced from the beverage ingredient, and a flow path linking the inlet to the outlet. The cartridge further comprises a filter (400) located in the flow path and an aperture (128) located in the flow path downstream of the filter, the aperture arranged, in use, to generate a jet of beverage. The filter has a plurality of openings (401) sized to retain a substantial portion of the elongate particles on the upstream side of the filter to prevent blockage of the aperture. The maximum area of each opening on the upstream face of the filter is no more than ten times the area of the aperture.

13 Claims, 5 Drawing Sheets

(51) Int. Cl.
  *A47J 31/06* (2006.01)
  *B65D 25/40* (2006.01)
  *B65D 85/80* (2006.01)

(56) References Cited

U.S. PATENT DOCUMENTS

| | | |
|---|---|---|
| 4,471,689 A | 9/1984 | Piana |
| 5,106,597 A | 4/1992 | Plester |
| 6,343,542 B1 | 2/2002 | Shen |
| 6,536,332 B2 | 3/2003 | Schmed |
| 6,607,762 B2 | 8/2003 | Lazaris |
| 6,644,173 B2 | 11/2003 | Lazaris |
| 6,740,345 B2 | 5/2004 | Cai |
| 7,543,527 B2 | 6/2009 | Schmed |
| 7,552,672 B2 | 6/2009 | Schmed |
| 7,685,930 B2 | 3/2010 | Mandralis |
| 7,981,451 B2 | 7/2011 | Ozanne |
| 8,039,029 B2 | 10/2011 | Ozanne |
| 8,039,034 B2 | 10/2011 | Ozanne |
| 8,263,148 B2 | 9/2012 | Yoakim |
| 8,424,447 B2 | 4/2013 | Colantonio |
| 8,443,717 B2 | 5/2013 | Venturi |
| 8,445,047 B2 | 5/2013 | Ozanne |
| 8,563,058 B2 | 10/2013 | Roulin |
| 8,640,604 B2 | 2/2014 | Doglioni Majer |
| 9,339,143 B2 | 5/2016 | Drost |
| 2002/0048621 A1 | 4/2002 | Boyd |
| 2002/0078831 A1 | 6/2002 | Cai |
| 2003/0039731 A1 | 2/2003 | Dalton |
| 2004/0089158 A1 | 5/2004 | Mahlich |
| 2005/0249052 A1 | 11/2005 | Benedetti |
| 2006/0045936 A1 | 3/2006 | Shen |
| 2007/0148290 A1 | 6/2007 | Ternite |
| 2007/0289453 A1 | 12/2007 | Halliday |
| 2008/0038441 A1 | 2/2008 | Kirschner |
| 2008/0245236 A1 | 10/2008 | Ternite |
| 2009/0047389 A1 | 2/2009 | Jarisch |
| 2009/0211458 A1 | 8/2009 | Denisart |
| 2009/0261030 A1 | 10/2009 | Hinxlage |
| 2010/0028495 A1 | 2/2010 | Novak |
| 2010/0047418 A1 | 2/2010 | Bongers |
| 2010/0062127 A1 | 3/2010 | Bongers |
| 2010/0108541 A1 | 5/2010 | Roberto |
| 2010/0132564 A1 | 6/2010 | Ozanne |
| 2010/0173055 A1 | 7/2010 | Brouwer |
| 2010/0260915 A1 | 10/2010 | Young |
| 2010/0263548 A1 | 10/2010 | Kokatsu |
| 2010/0297299 A1 | 11/2010 | Epars |
| 2011/0005399 A1 | 1/2011 | Epars |
| 2011/0064852 A1 | 3/2011 | Mann |
| 2011/0076361 A1 | 3/2011 | Peterson |
| 2011/0097450 A1 | 4/2011 | Kruger |
| 2011/0142996 A1 | 6/2011 | Kruger |
| 2011/0183043 A1 | 7/2011 | Reati |
| 2011/0185910 A1 | 8/2011 | Ryser |
| 2012/0015080 A1 | 1/2012 | Roulin |
| 2012/0052163 A1 | 3/2012 | Doleac |
| 2012/0052164 A1 | 3/2012 | Doleac |
| 2012/0121768 A1 | 5/2012 | Lai |
| 2012/0171332 A1 | 7/2012 | Lai |
| 2012/0171333 A1 | 7/2012 | Crump |
| 2012/0199227 A1 | 8/2012 | Manser |
| 2012/0201933 A1 | 8/2012 | Dran |
| 2013/0055903 A1 | 3/2013 | Deuber |
| 2013/0129872 A1 | 5/2013 | Kruger |
| 2013/0230625 A1 | 9/2013 | Brouwer |

FOREIGN PATENT DOCUMENTS

| | | |
|---|---|---|
| CA | 808588 | 3/1969 |
| CN | 1340324 | 3/2002 |
| CN | 2708780 | 7/2005 |
| CN | 1942375 | 4/2007 |
| CN | 101636099 | 1/2010 |
| CN | 101877983 | 11/2010 |
| DE | 102004002005 | 8/2005 |
| DE | 202005001371 | 6/2006 |
| DE | 202005021160 U | 4/2007 |
| DE | 202009017808 U | 6/2010 |
| DE | 102009050537 | 4/2011 |
| DE | 102009041633 | 6/2011 |
| DE | 102009058646 | 6/2011 |
| DE | 102010027485 | 1/2012 |
| DE | 102010034206 | 2/2012 |
| DE | 102010048514 | 4/2012 |
| DE | 102010048517 | 4/2012 |
| DE | 102011010534 | 8/2012 |
| DE | 102010048421 | 10/2014 |
| DE | 10211327 | 9/2015 |
| EP | 0272922 | 6/1988 |
| EP | 0445337 | 9/1991 |
| EP | 0638486 | 2/1995 |
| EP | 1101430 | 5/2001 |
| EP | 1274332 | 1/2003 |
| EP | 1344722 | 9/2003 |
| EP | 1398279 | 3/2004 |
| EP | 1440636 | 7/2004 |
| EP | 1440639 | 7/2004 |
| EP | 1440644 | 7/2004 |
| EP | 1440903 | 7/2004 |
| EP | 1440904 | 7/2004 |
| EP | 1440908 | 7/2004 |
| EP | 1440909 | 7/2004 |
| EP | 1440911 | 7/2004 |
| EP | 1440914 | 7/2004 |
| EP | 1500358 | 1/2005 |
| EP | 1555219 | 7/2005 |
| EP | 1774878 | 4/2007 |
| EP | 1775234 | 4/2007 |
| EP | 1792850 | 6/2007 |
| EP | 1826148 | 8/2007 |
| EP | 1864917 | 12/2007 |
| EP | 1894850 | 3/2008 |
| EP | 1894854 | 3/2008 |
| EP | 1716055 | 8/2008 |
| EP | 1975087 | 10/2008 |
| EP | 1980501 | 10/2008 |
| EP | 2062831 | 5/2009 |
| EP | 2236437 | 10/2010 |
| EP | 2239212 | 10/2010 |
| EP | 2289820 | 3/2011 |
| EP | 2298667 | 3/2011 |
| EP | 2298671 | 3/2011 |
| EP | 2345352 | 7/2011 |
| EP | 2347976 | 7/2011 |
| EP | 2227120 B1 | 9/2011 |
| EP | 2030915 | 10/2011 |
| EP | 2384996 | 11/2011 |
| EP | 2384997 | 11/2011 |
| EP | 2481330 | 8/2012 |
| EP | 2487122 | 8/2012 |
| FR | 2754793 | 4/1998 |
| GB | 2235868 | 3/1991 |
| GB | 2410888 | 8/2005 |
| GB | 2411106 | 8/2005 |
| GB | 2468047 | 8/2010 |
| GB | 2480827 | 12/2011 |
| JP | 2000093309 | 4/2000 |
| JP | 2007522053 | 8/2007 |
| NO | 20050219 | 7/2005 |
| NO | 20084023 | 9/2008 |
| NO | 20093120 | 10/2009 |
| NO | 331753 | 3/2012 |
| RU | 2306839 | 9/2007 |
| TW | 183169 | 10/1980 |
| TW | 200916382 | 4/2009 |
| WO | 9923888 | 5/1999 |
| WO | 01060220 | 1/2001 |
| WO | 0158786 | 8/2001 |
| WO | 02074661 | 1/2002 |
| WO | 02082962 | 1/2002 |
| WO | 2002043539 | 1/2002 |
| WO | 2002058522 | 1/2002 |
| WO | 200228241 | 4/2002 |

(56) References Cited

FOREIGN PATENT DOCUMENTS

| | | |
|---|---|---|
| WO | 02058522 | 8/2002 |
| WO | 2004026091 | 1/2004 |
| WO | 2004065225 | 1/2004 |
| WO | 2004065256 | 1/2004 |
| WO | 2004065257 | 1/2004 |
| WO | 2004065258 | 1/2004 |
| WO | 2004100739 | 11/2004 |
| WO | 2005018395 | 1/2005 |
| WO | 2005079637 | 1/2005 |
| WO | 2005079639 | 1/2005 |
| WO | 2005080223 | 1/2005 |
| WO | 2005080222 | 9/2005 |
| WO | 2006021405 | 1/2006 |
| WO | 2006030461 | 1/2006 |
| WO | 2006043096 | 1/2006 |
| WO | 2006043109 | 1/2006 |
| WO | 2006111807 | 2/2006 |
| WO | 2006043102 | 4/2006 |
| WO | 2006043108 | 4/2006 |
| WO | 2006066622 | 6/2006 |
| WO | 2007060538 | 1/2007 |
| WO | 2007096196 | 1/2007 |
| WO | 2007125337 | 2/2007 |
| WO | 2007042414 | 4/2007 |
| WO | 2007042415 | 4/2007 |
| WO | 2008004073 | 1/2008 |
| WO | 2008018793 | 1/2008 |
| WO | 2008025715 | 1/2008 |
| WO | 2008025730 | 1/2008 |
| WO | 2008025785 | 1/2008 |
| WO | 2008034464 | 1/2008 |
| WO | 2008078988 | 1/2008 |
| WO | 2008078989 | 1/2008 |
| WO | 2008126045 | 1/2008 |
| WO | 2008113779 | 9/2008 |
| WO | 2008132571 | 11/2008 |
| WO | 2009017927 | 12/2008 |
| WO | 2009008723 | 1/2009 |
| WO | 2009050570 | 1/2009 |
| WO | 2009081250 | 7/2009 |
| WO | 2009092629 | 7/2009 |
| WO | 2009115475 | 9/2009 |
| WO | 2010004687 | 1/2010 |
| WO | 2010085824 | 1/2010 |
| WO | 2010112353 | 1/2010 |
| WO | 2010128031 | 2/2010 |
| WO | 2010128051 | 2/2010 |
| WO | 2010089106 | 8/2010 |
| WO | 2011031294 | 1/2011 |
| WO | 2011032718 | 1/2011 |
| WO | 2011042489 | 1/2011 |
| WO | 2011047867 | 1/2011 |
| WO | 2011082781 | 1/2011 |
| WO | 2011137550 | 2/2011 |
| WO | 2011154690 | 2/2011 |
| WO | 2011089049 | 7/2011 |
| WO | 2011124990 | 10/2011 |
| WO | 2012004133 | 1/2012 |
| WO | 2012010317 | 1/2012 |
| WO | 2012076135 | 1/2012 |
| WO | 2012123106 | 1/2012 |
| WO | 2012135204 | 2/2012 |
| WO | 2012168764 | 2/2012 |
| WO | 2012175985 | 2/2012 |
| WO | 2012080928 | 6/2012 |
| WO | 2012094244 | 7/2012 |
| WO | 2012117383 | 9/2012 |
| WO | 2012123440 | 9/2012 |
| WO | 2012125032 | 9/2012 |
| WO | 2013032330 | 1/2013 |
| WO | 2013039590 | 1/2013 |
| WO | 2013043048 | 1/2013 |
| WO | 2013101302 | 1/2013 |
| WO | 2014110355 | 1/2014 |
| WO | 2014163499 | 10/2014 |
| WO | 2014033340 | 10/2015 |

OTHER PUBLICATIONS

Combined Search and Examination Report for Application No. GB1222937.3, dated May 23, 2013 (4 pgs.).
Examination Report dated Aug. 24, 2016 for Application No. GB1410615.7 (3 pgs.).
International Search Report, dated Dec. 7, 2015 for International Application No. PCT/IB2015/001013 (4 pgs.).
International Search Report, dated Mar. 20, 2014 for International Application No. PCT/IB2013/002904 (3 pgs.).
Japan Patent Office, Notice of Reasons for Rejection, dated Apr. 25, 2016 for Japanese Patent Application No. 2015-544556, with English translation (5 pgs.).
Notification of Grant for Application No. GB1222937.3 dated Oct. 21, 2014 (2 Pgs.).
Notification of the First Office Action, dated Dec. 30, 2016 for Chinese Patent Application No. 201380064896.3, with English translation (13 pgs.).
Office Action, dated Jun. 21, 2016 for Russian Patent Application No. 2015114366, with English translation (7 pgs.).
Response to combined search and examination report dated Jun. 12, 2013 for Patent Application No. GB1222937.3 (1 pg.).
Written Opinion of the International Searching Authority for International Application No. PCT/IB2015/001013 (7 pgs.).
English translation of Search Report of Taiwanese Patent Application No. 104118583, dated Jan. 23, 2017 (1 pg.).
International Search Report and Written Opinion dated Sep. 21, 2011, for corresponding International (PCT) Application No. PCT/GB2011/000851 (8 pgs.).
Japanese Patent Office Office Action Summary for Application No. 2013-504338 (2 pgs.).
Letter from Boult Wade Tennant to UK Intellectual Property Office in response to Search and Examination Report for GB1009854.9 dated May 13, 2011 (11 pgs.).
Notification of the First Office Action, dated Apr. 16, 2014 for China Application No. 201180026110.X, with English translation (13 pgs.).
Singh, R.P., Heldman, D.E. , Introduction to Food Engineering, 3 ed., Academic Press, San Diego, C.A., 2001, p. 150-153 (8 pgs.).
UK Intellectual Property Office, Combined Search and Examination Report for GB1009854.9, dated Oct. 18, 2010 (7 pgs.).
UK Intellectual Property Office, Notification of Grant for GB 1009854.9, dated May 22, 2012 (2 pgs.).

CARTRIDGE AND METHOD FOR THE PREPARATION OF BEVERAGES

CROSS REFERENCE TO RELATED APPLICATIONS

This application is a divisional of U.S. patent application Ser. No. 13/699,165, filed Nov. 20, 2012, which is a U.S. national phase application of International Application No. PCT/GB2011/000851, filed Jun. 6, 2011, which claims benefit from Great Britain application No. 1009854.9, filed Jun. 11, 2010, which are all hereby incorporated herein by reference in their entireties.

FIELD

The present invention relates to cartridges for the preparation of beverages and which contain one or more ingredients for the preparation of beverages.

BACKGROUND

The preparation of high quality coffee beverages has been well known in commercial coffee shops for many years. Throughout the years methods of making coffee have been refined and skilled people trained to produce the best coffee beverages. There has been rapid growth, particularly in the last 10 years, of coffee shops offering more specialist drinks such as espresso and cappuccino. These types of beverages have historically been regarded as luxury items because of the need for expensive, complex machines capable of producing the high pressures necessary for making them. Such machines have to be properly operated and maintained by a trained barista to produce good quality.

Consumers' tastes for high quality coffee beverages has not only increased demand for luxury top quality beverages from specialist coffee shops, it has also led to a desire for a greater variety of speciality beverages, and the ability to make such beverages in the comfort of one's own home.

Domestic filter coffee machines have been widely available since the 1960s. However, such machines are not able to produce espresso style coffee, nor foamed milk required for the preparation of speciality drinks such as cappuccino. Domestic coffee machines have developed significantly since the introduction of the first filter machines and are now essential pieces of kitchen equipment in many households. Some such machines dispense individual servings of a beverage directly into a drinking receptacle, and derive the beverage from a bulk supply of beverage ingredient or from individual packages of beverage ingredient such as pods, pads or cartridges. In the following specification, such packages will be referenced by the general term cartridges. Machines which use such cartridges eliminate the need for cleaning and can enable the user to make a selection of beverages. An example of one type of such cartridge is described in EP-A-1440903. The beverages are formed from brewing, mixing, dissolving or suspending the beverage ingredients in water. For example, for coffee beverages, heated water is forced through the cartridges to form the extracted solution. The use of cartridges in such machines has become increasingly popular due to their convenience and the quality of the beverage produced.

An example of a machine for preparing beverages using this type of cartridge is described in EP-A-1140644. This type of machine provided an improvement over the prior art known at the time in that it operated at a lower pressure than the previously known machines, which were designed for the commercial or industrial markets rather than the domestic market. Hence it was more suitable for the domestic market in terms of cost, reliability and performance.

Despite the advances made in domestic coffee machines and associated cartridges, there continues to be a demand for ever better barista quality coffee beverages which can be readily prepared in the home without the need for specialist equipment or training.

To allow a user to produce a full range "coffee shop" style beverages in the home it is not only necessary to provide means for brewing high quality espresso type coffee, it is also necessary to provide the user with means for producing foamed milk to make beverages such as cappuccino. Traditionally foamed milk has been produced in coffee shops by using a steam wand to direct a steam jet into a reservoir of milk. This is still the primary method of producing foamed milk in a commercial environment. However, it is inconvenient to use steam jet equipment in the home since it can be dangerous if not used correctly and can also be difficult to clean. This is particularly disadvantageous for equipment used with milk which requires thorough cleaning to prevent contamination.

An example of a cartridge for a domestic beverage machine which is suitable for producing foamed milk is known from EP-A-1716055. Foamed milk is produced from the cartridge by causing air to become entrained in a milk stream produced when water is mixed with a concentrated milk ingredient contained within the cartridge. This is achieved by passing milk through an eductor within the cartridge. The eductor comprises an aperture, which is arranged to produce a jet of milk. The jet of milk passes over an air inlet causing air to become entrained in the milk thereby creating foamed milk. Foamed milk produced from such cartridges allows coffee shop style beverages, such as cappuccino, to be readily produced in the home without the need for potentially dangerous, and difficult to clean, steam wand equipment. It is desirable to continue to develop such cartridges to further improve the quality of foamed milk which may be produced in the home.

Investigations have shown that elongate agglomerate particles form in the concentrated liquid milk ingredient of the cartridges during processing and storage. These particles have the potential to block, or partially block, the aperture resulting in less air being entrained in the milk stream, if this happens, the quality and quantity of the foamed milk can be adversely affected.

It is known to use filters in cartridges for beverage machines to prevent particulate matter from reaching the outlet of the cartridge and thus contaminating the beverage. Filters are, for example, commonly employed in cartridges for the production of coffee as described in EP-A-1440903 referenced above. Such filters comprise a plurality of fine openings which are smaller than the smallest dimension of the particulate matter to be filtered. This has the effect of preventing fine particulate matter from reaching the outlet of the cartridge. However, it also has the effect of restricting the flow of beverage through the cartridge as particulate beverage ingredient builds up on the upstream side of the filter. Such flow restriction is not desirable in cartridges used for the production of foamed milk since flow restriction reduces the efficacy of the eductor and consequently reduces the quality and quantity of the foamed milk produced. This is in direct contrast to the desired effect of improving foam quality and quantity.

SUMMARY

In a first aspect, a cartridge containing one or more beverage ingredients is provided, said cartridge comprising:

an inlet for the introduction of an aqueous medium into the cartridge;

an outlet for a beverage produced from said one or more beverage ingredients; and a flow path linking the inlet to the outlet;

wherein the one or more beverage ingredients comprise liquid beverage ingredient and elongate particles of beverage ingredient;

the cartridge further comprising a filter located in the flow path, said filter comprising a plurality of openings which are sized such that a substantial portion of the elongate particles are retained on the upstream side of the filter, wherein the cartridge further comprises an aperture located in the flow path downstream of the filter, the aperture being arranged, in use, to generate a jet of beverage, wherein the maximum area of each opening on the upstream face of the filter is no more than ten times the area of the aperture.

The filter prevents the majority of the elongate particles from reaching the downstream side of the cartridge. This helps to prevent the particles blocking, or interfering with the operation of, the downstream side of the cartridge. In particular, it helps to prevent the aperture from becoming blocked. Thus the cartridge is able to produce better quality more repeatable results without the need to modify the formulation of the beverage ingredients or the downstream features of the cartridge.

When used with milk preparations the openings preferably have a maximum dimension of 1.6 mm on the upstream face of the filter. This has been found to provide a suitable balance between maximising the amount of elongate particles retained by the filter and minimising the disruption of liquid flow within the cartridge.

More preferably, when used with milk preparations, the openings have a maximum dimension of 1.0 mm on the upstream face of the filter to optimise the balance between maximising the amount of elongate particles retained by the filter and minimising the disruption of liquid flow within the cartridge. The maximum dimension on the upstream face of the filter may advantageously be selected for a specific drink formulation to balance the consistency and quality of the foam and the amount of ingredient retained by the cartridge.

In a preferred embodiment the maximum area of each opening on the upstream face of the filter is no more than seven times the area of the aperture. Most preferably the maximum area of each opening on the upstream face of the filter is no more than five times the area of the aperture. The relationship between the size of the openings in the filter and the size of the downstream aperture influences the likelihood of the downstream aperture becoming blocked.

The elongate particles of beverage ingredient may be agglomerates of the liquid beverage ingredient. The liquid beverage ingredient may be a liquid dairy-based ingredient such as concentrated milk. The liquid milk may be pasteurised or sterilised by known methods such as UHT treatment, flash pasteurisation, retorting, etc.

In a second aspect, a method of making a beverage from a cartridge containing one or more beverage ingredients is provided, said one or more beverage ingredients comprising liquid beverage ingredient and elongate particles of beverage ingredient, the method comprising the steps of:

introducing an aqueous medium into the cartridges;

mixing the aqueous medium with the one or more beverage ingredients to form a beverage mixture;

passing the beverage mixture through a filter such that a substantial portion of the elongate particles are retained on the upstream side of the filter; and generating a jet of the beverage mixture by passing the beverage mixture through an aperture located downstream of the filter, the maximum area of each opening on the upstream face of the filter being no more than ten times the area of the aperture.

In a third aspect, a system for making a beverage is provided, the system comprising: a cartridge according to the first aspect; and a beverage machine arranged, in use, to produce a beverage from said cartridge.

In a fourth aspect, a method of making a beverage is provided, the method comprising: providing a cartridge according to the first aspect; providing a beverage machine; placing said cartridge in operational engagement with the beverage machine; and operating the beverage machine to produce a beverage. It will be understood that by the term "cartridge" as used herein is meant a package, container, sachet or receptacle which contains one or more beverage ingredients in the manner described and is suitable for use with a beverage preparation machine. The cartridge may comprise a single component or an equivalent of multiple components, such as a soft pad located in a separate pad holder. Preferably the cartridge is adapted to produce an individual serving of beverage. The cartridge may be rigid, semi-rigid or flexible. The inlet and outlet of the cartridge may be open or require opening in use by, for example, piercing.

In the following description the terms "upper" and "lower" and equivalents will be used to describe the relational positioning of features. The terms "upper" and "lower" and equivalents should be understood to refer to the cartridge (or other components) in its normal orientation for insertion into a beverage preparation machine and subsequent dispensing as shown, for example, in FIG. 1. In particular, "upper" and "lower" refer, respectively, to relative positions nearer or further from a top surface 11 of the cartridge. In addition, the terms "inner" and "outer" and equivalents will be used to describe the relational positioning of features. The terms "inner" and "outer" and equivalents should be understood to refer to relative positions in the cartridge (or other components) being, respectively, nearer or further from a centre or major axis of the cartridge 1 (or other component).

BRIEF DESCRIPTION OF THE DRAWINGS

Embodiments will now be described, by way of example only, with reference to the accompanying drawings, in which.

DETAILED DESCRIPTION

Figure 1:
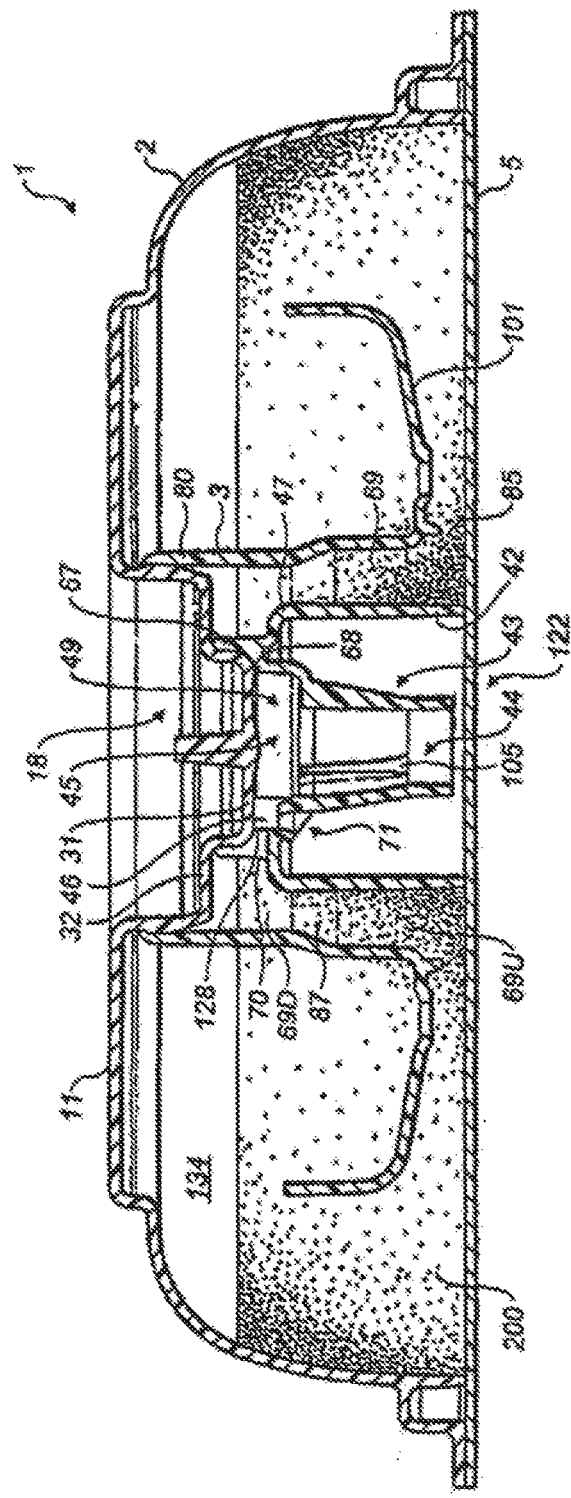
FIG. 1 is a cross-sectional drawing of a prior art cartridge as taught in EP-A-1716055.

FIG. 1 shows a prior art cartridge 1 as described in the applicant's earlier European patent publication number EP-A-1716055. For a full description of the cartridge 1, the reader is directed to the disclosure of EP-A-1716055 which is incorporated herein by reference. In the following, only those parts of the cartridge 1 which relate to the present invention will be described in detail.

The cartridge 1 of EP-A-1716055 generally comprises an outer member 2, an inner member 3 and a laminate lid 5. The outer member 2, inner member 3 and laminate 5 are assembled to form the cartridge 1 which has a chamber 134 for containing one or more beverage ingredients 200, an inlet 28 (see FIG. 2), an outlet 122 and a beverage flow path linking the inlet to the outlet 122.

In the example of FIG. 1 the beverage ingredient 200 is concentrated liquid milk. The concentrated liquid milk 200 comprises a mixture of concentrated liquid milk and elongate agglomerate particles of milk which form in the concentrated liquid milk during processing and storage. The elongate agglomerate particles typically have a length to maximum width ratio which is greater than 10.

The inner member 3 comprises a discharge spout 43 surrounded by an outer tube 42 which is connected to the discharge spout 43 by annular flange 47. The inner member 3 also comprises a skirt portion 80 which is connected to the outer tube 42 by skirt ribs 87. An annular channel 69 is defined between the inner wall of the skirt portion 80 and the outer wall of the outer tube 42. The annular channel 69 has an upstream portion 69U below the skirt ribs 87 and a downstream portion 69D above the skirt ribs 87. Fluid communication between the upstream portion 69U and the downstream portion 69D of the annular channel 69 is provided by the spaces between the ribs 87. Finally, skirt portion 80 of inner member 3 comprises a bowl 101 for regulating the mixing of the beverage ingredient.

The beverage flow path passes through chamber 134, annular channel 69 and discharge spout 43 as will be described in greater detail below.

The inlet 28 and outlet 122 are initially sealed by the laminate 5 and are opened in use by piercing or cutting of the laminate 5. The beverage flow path is defined by spatial inter-relationships between the outer member 2, inner member 3 and laminate 5.

The various types of cartridge shown in EP-A-1716055 may be used for dispensing roast and ground products or liquid products such as concentrated liquid milk. It is also possible to dispense liquid coffee products.

A particular advantage of the cartridges shown in FIGS. 18 and 34 of EP-A-1716055 is the provision of means for entraining air into the beverage, for example in the form of an eductor. As used herein, the term eductor refers to the use of an aperture, or similar structure, to form a jet of beverage, the aperture being located in the beverage flow path upstream of an air inlet and an expansion chamber, said aperture being arranged to produce a jet of beverage which jets into the expansion chamber to produce a low pressure zone in the vicinity of the air inlet which causes air to be drawn through the air inlet and to become entrained in the beverage stream.

As shown in FIG. 1 (based on FIG. 34 of EP-A-1716055) a rim 67 is provided on the inner member 3 upstanding from annular flange 47 joining outer tube 42 to discharge spout 43. The rim 67 surrounds an inlet 45 to the discharge spout 43. The rim 67 is provided with an inwardly directed shoulder 68. At one point around the circumference of the rim 67 a slot 70 is provided, the slot 70 extending from an upper edge of rim 67 to a point marginally below the level of the shoulder 68.

An air inlet 71 is provided in annular flange 47 circumferentially aligned with the slot 70. The air inlet 71 comprises an aperture passing through the flange 47 so as to provide communication between a point above the flange 47 and the void space below the flange 47 between the outer tube 42 and discharge spout 43. The air inlet 71 comprises an upper frusto-conical portion and a lower cylindrical portion. The wall of the outer tube 42 in the vicinity of the air inlet 71 is shaped to form a chute 46 leading from the air inlet 71 to the inlet 45 of the discharge spout 43.

Three axial ribs 105 are provided on the inner surface of the discharge spout 43 to direct the dispensed beverage downwards towards the outlet 44 to help to confine the dispensed beverage into a relatively narrow, controlled stream.

As shown in FIG. 1, when the cartridge is assembled, a cylindrical extension 18 of the outer member 2 is seated within the rim 67. The cylindrical extension 18 substantially closes off the inlet 45 of the discharge spout 43 including closing off the upper end of the slot 70. Because the slot 70 in the rim 67 extends below the level of the shoulder 68, an aperture 128 remains open to provide a fluid path through the annular flange 47. Thus on assembly, the slot 70 is configured to become an approximately square-shaped aperture 128.

In use, the cartridge 1 is inserted into a beverage preparation machine and the inlet 28 and outlet 122 are opened by piercing members of the beverage preparation machine which perforate and fold back the laminate 5. An aqueous medium, typically water, under pressure enters the cartridge 1 through the inlet and is directed to flow into the chamber 134. The water is forced along the beverage flow path through the chamber 134 and mixes with the beverage ingredient 200 contained therein. The water is at the same time forced upwardly through the beverage ingredient.

The back pressure of beverage collecting in the chamber 134 forces the beverage under pressure through the aperture 128 emerging as a jet into a mixing chamber 49 at the upper end of the discharge spout 43. The jet of beverage passes directly over the air inlet 71. As the beverage enters the chute and inlet 45 of the discharge spout 43 the pressure of the beverage jet drops. As a result air is entrained into the beverage stream in the form of a multitude of small air bubbles as the air is drawn up through the air inlet 71. The jet of beverage issuing from the aperture 128 turbulently flows within the mixing chamber 49 before being funnelled downwards to the outlet spout 44 where the beverage is discharged into a receptacle such as a cup where the air bubbles form the desired frothy appearance.

Figure 2:
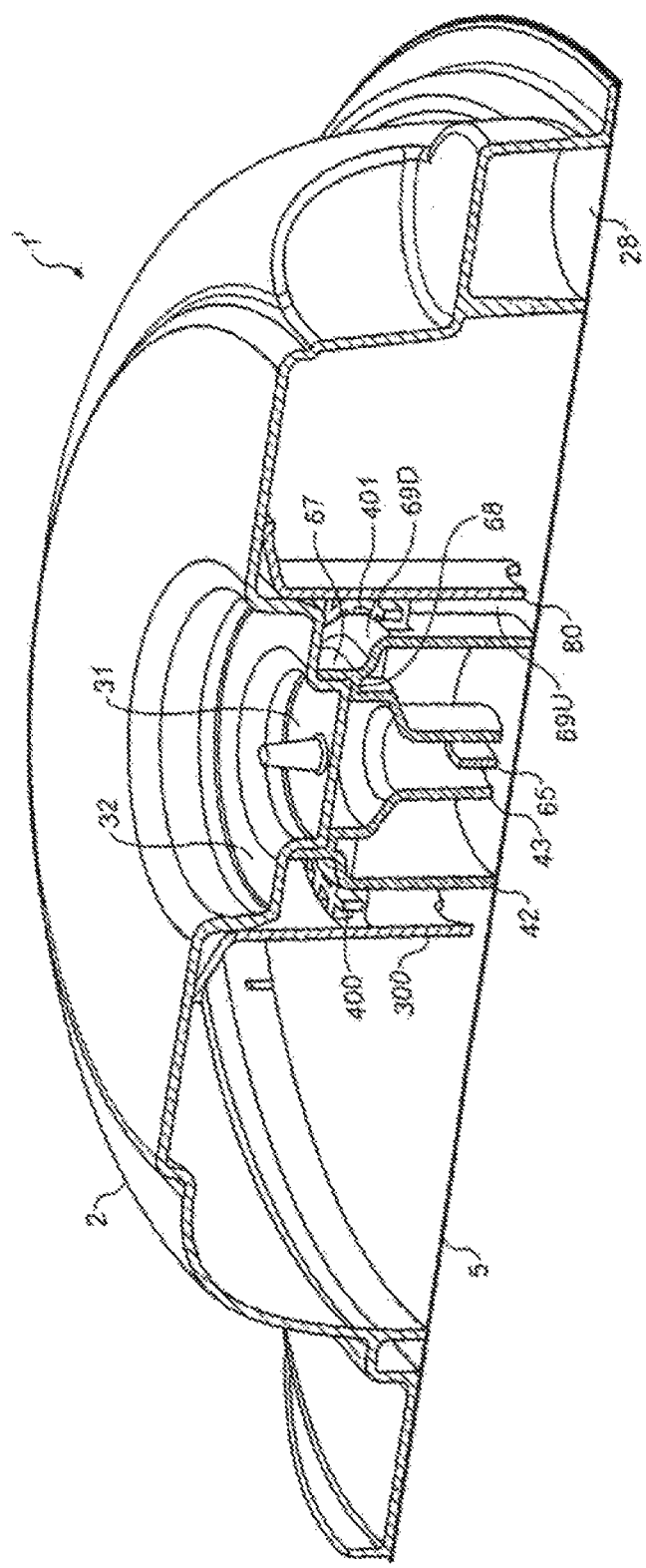
FIG. 2 is a sectional perspective view of a cartridge having an inner member.

FIG. 2 shows a sectional perspective view of a cartridge 1' having an inner member 300. Many of the features of the inner member 300 are the same as described above with reference to inner member 3 and like numerals have been used to reference like features where appropriate. For clarity, cartridge 1' is depicted in FIG. 2 containing no beverage ingredient. In addition, the sectional view of FIG. 2 is such that the slot 70 and aperture 128 are not visible.

Inner member 300 differs from inner member 3 in the (optional) removal of ribs 105 and the addition of partition 65 in the lower portion of the discharge spout 43. In addition, inner member 300 has no bowl 101.

Inner member 300 comprises a filter 400 located in the annular channel 69 between the upstream portion 69U and downstream portion 69D. The filter 400 comprises openings 401 which are sized so that, in use, the majority of the elongate agglomerate particles are retained on the upstream side of the filter. The filter prevents the majority of the elongate particles from reaching the aperture 128 and thereby helps to prevent the aperture 128 from becoming totally or partially blocked by the elongate particles. The repeatability of foam quality produced from the cartridge 1' is therefore improved over prior art cartridges.

The openings 401 can be of any suitable size and configuration. However, in order to achieve a suitable balance between maximising the amount of elongate particles retained by the filter 400 and minimising the disruption of liquid flow within the cartridge, the openings 401 preferably have a maximum dimension on the upstream face which is no greater than 1.6 mm. The openings 401 ideally have a maximum dimension on the upstream face which is no greater than 1.0 mm to optimise the balance between maximising the amount of elongate particles retained by the filter 400 and minimising the disruption of liquid flow within the cartridge.

The maximum dimension of an opening 401 is defined as the linear distance between the two furthest points on the periphery of the opening on the upstream face of the filter.

The area of the openings 401 may be related to the area of the aperture 128 such that the area of the openings 401 is no greater than ten times the area of the aperture 128, where the area of an opening is its maximum cross-section. Alternatively, the area of the openings 401 may be no greater than seven times the area of the aperture 128. Alternatively again, the area of the openings 401 may be no greater than five times the area of the aperture 128.

As indicated above, it is not necessary for the filter 400 to retain all of the elongate particles on the upstream side of the filter. It is the longer agglomerates which are more likely to affect the operation of the cartridge. It is therefore preferable that the filter retain the longer of the elongate particles on the upstream side.

Figure 3:
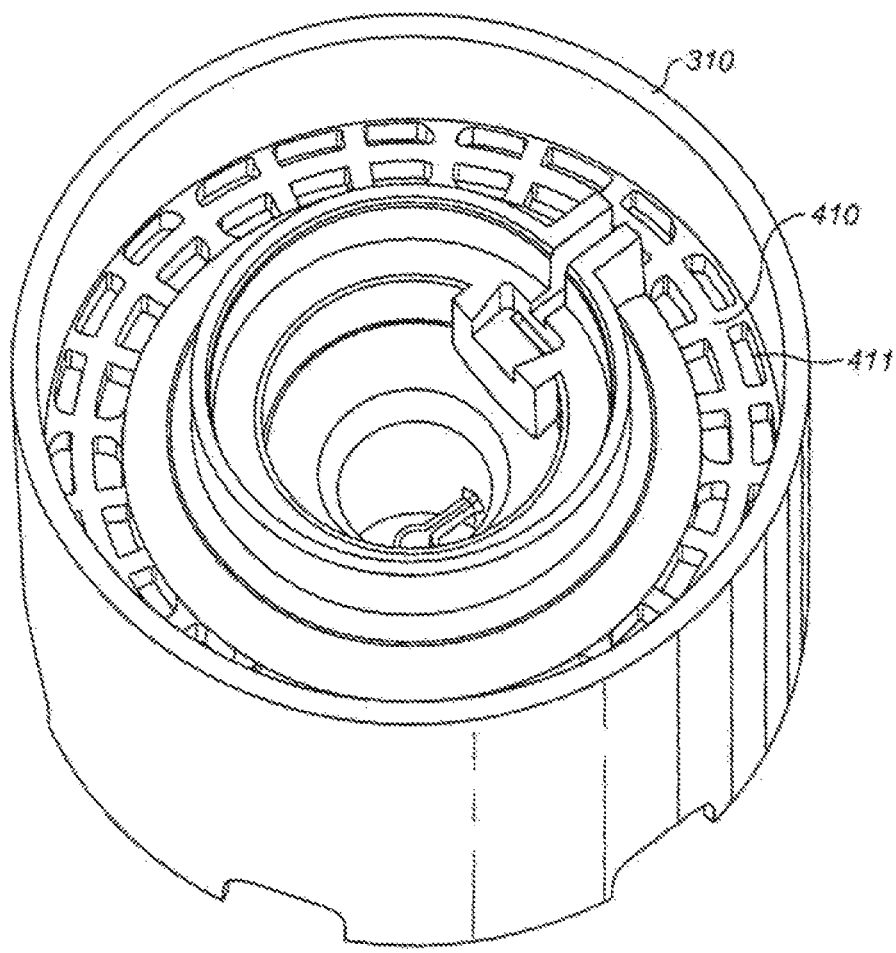
FIG. 3 is a perspective view of an alternative inner member.

FIG. 3 shows a perspective view of an alternative inner member 310. The inner member 310 is the same as the inner member 300 described above except in that it comprises an alternative eductor geometry. The inner member 310 comprises a filter 410 having openings 411 which are sized to retain the majority of the elongate agglomerate particles on the upstream side of the filter in use.

Figure 4:
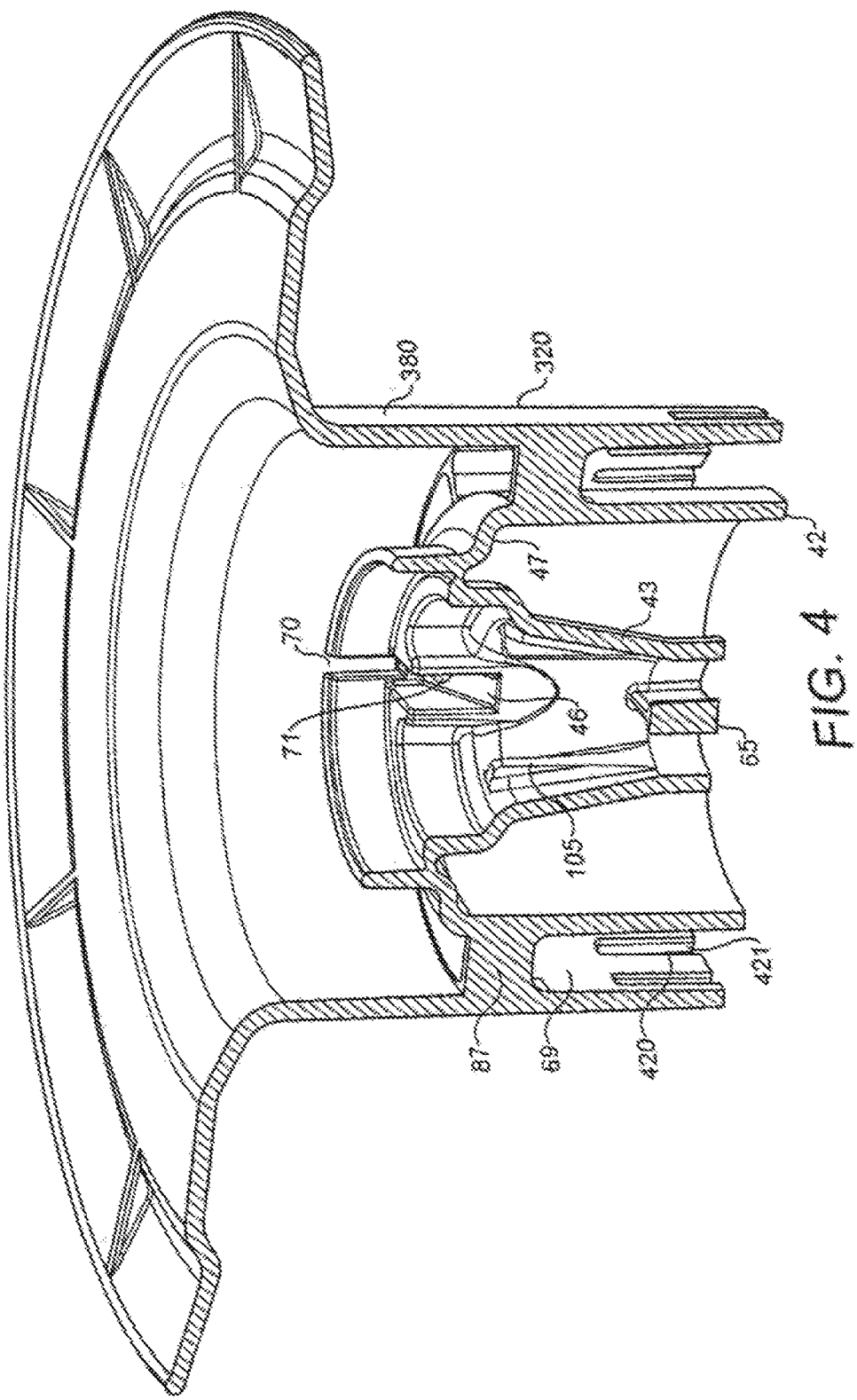
FIG. 4 is a perspective view of a further alternative inner member.
Figure 5:
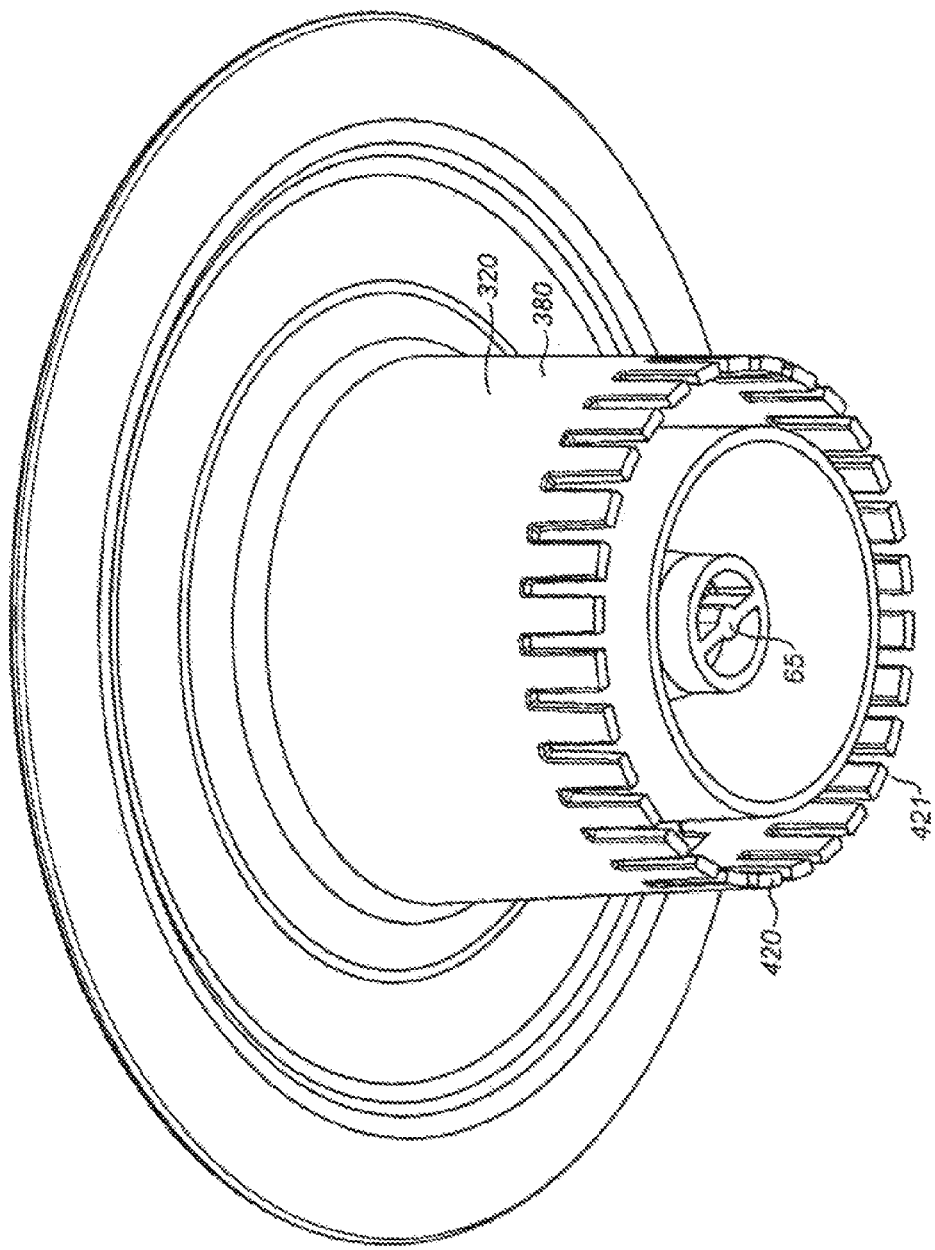
FIG. 5 is an alternative perspective view of the inner member of FIG. 4.

FIGS. 4 and 5 show perspective views of a further alternative inner member 320. Some of the features of the inner member 320 are the same as described above with reference to inner member 3 of FIG. 1 and like numerals have been used to reference like features where appropriate.

The inner member 320 comprises a discharge spout 43 surrounded by an outer tube 42 which is connected to the discharge spout 43 by annular flange 47. The inner member 320 also comprises a skirt portion 380 which is connected to the outer tube 42 by skirt ribs 87. An annular channel 69 is defined between the inner wall of the skirt portion 380 and the outer wall of the outer tube 42.

The skirt 380 comprises a filter 420 having a plurality of elongate slots 421 located around the lower portion of the skirt 380. Referring to FIG. 1, in the assembled cartridge, the bottom of the skirt 380 contacts the laminate 3 so that the bottom of the openings 421 are substantially closed. The slots 421 provide fluid communication between the chamber 134 and the channel 69. The slots 421 are sized to retain the majority of the elongate agglomerate particles in the chamber 134 on the upstream side of the filter 420 in use.

The invention has been described above by way of example embodied in a cartridge formed from, amongst other parts, an outer member and an inner member. In particular, the aperture 128 has been described as delimited by portions of the outer and inner members. However, it is to be understood that the invention is also applicable to apertures formed in a single component rather than from the junction of two components.

The cartridge described is suitable for any liquid product which forms elongate agglomerates. For example, concentrated chocolate, flavour enhancing syrups or vitamin supplements.

The invention claimed is:

1. A cartridge containing one or more beverage ingredients, said cartridge comprising;
   An inner member and an outer member;
   an inlet for the introduction of an aqueous medium into the cartridge;
   an outlet for a beverage produced from said one or more beverage ingredients;
   a flow path linking the inlet to the outlet defined by the inner and outer members;
   wherein the inlet and outlet and inlet are initially sealed and are opened in use, thereby sealing the one or more beverage ingredients in the cartridge prior to use;
   wherein the one or more beverage ingredients comprise a liquid beverage ingredient and elongate agglomerate particles of the liquid beverage ingredient;
   the inner member comprising a skirt portion, the skirt portion comprising a filter located in the flow path, the filter comprising a plurality of elongate slots located around a lower portion of the skirt portion, the slots being sized such that a substantial portion of the elongate agglomerate particles are retained on the upstream side of the filter,
   wherein the cartridge further comprises an aperture, the aperture being arranged to generate in use a jet of beverage, wherein the maximum area of each elongate slot on the upstream face of the filter is no more than ten times the area of the aperture.

2. A cartridge as claimed in claim 1, wherein the liquid beverage ingredient is a liquid dairy-based ingredient.

3. A cartridge as claimed in claim 2 wherein the liquid beverage ingredient is concentrated liquid milk.

4. A cartridge as claimed in claim 1, wherein the one or more beverage ingredients comprise powdered beverage ingredient.

5. A cartridge as claimed in claim 1, wherein the cartridge comprises a discharge spout disposed inwardly of the tube.

6. A cartridge as claimed in claim 5, wherein the annular channel has an upstream entrance and a downstream exit, and the filter is disposed closer to the exit than the entrance of the annular channel.

7. A cartridge as claimed in claim 6, wherein the cartridge further comprises an air inlet downstream of the aperture.

8. A cartridge as claimed in claim 7, wherein the air inlet is in communication with a space between the discharge spout and the tube.

9. A cartridge as claimed in claim 1, wherein the openings have a maximum dimension of 1.6 mm on the upstream face of the filter.

10. A cartridge as claimed in claim 1, wherein the openings have a maximum dimension of 1.0 mm on the upstream face of the filer.

11. A cartridge as claimed in claim 1, wherein the maximum area of each opening on the upstream face of the filter is no more than seven times the area of the aperture.

12. A cartridge as claimed in claim 1, wherein the maximum area of each opening on the upstream face of the filter is no more than five times the area of the aperture.

13. A cartridge as claimed in claim 1, wherein the aperture is located in the flow path downstream of the filter.

* * * * *

UNITED STATES PATENT AND TRADEMARK OFFICE
CERTIFICATE OF CORRECTION

PATENT NO. : 9,919,864 B2  
APPLICATION NO. : 15/207382  
DATED : March 20, 2018  
INVENTOR(S) : Geoffrey York Page 1 of 1

It is certified that error appears in the above-identified patent and that said Letters Patent is hereby corrected as shown below:

In the Claims

In Claim 1, Column 8, Line 8, delete "comprising;" and insert -- comprising: --, therefor.
In Claim 1, Column 8, Line 9, delete "An" and insert -- an --, therefor.
In Claim 1, Column 8, Line 16, delete "inlet and outlet and inlet" and insert -- inlet and outlet --, therefor.

Signed and Sealed this  
Fifteenth Day of May, 2018

Andrei Iancu  
*Director of the United States Patent and Trademark Office*